(12) United States Patent
Bricker (10) Patent No.: US 8,596,649 B2
(45) Date of Patent: Dec. 3, 2013

(54) SPIN-OUT RIDING TOY

(75) Inventor: Jeffrey Bricker, Chicago, IL (US)

(73) Assignee: Radio Flyer Inc., Chicago, IL (US)

(*) Notice: Subject to any disclaimer, the term of this patent is extended or adjusted under 35 U.S.C. 154(b) by 132 days.

(21) Appl. No.: 13/110,356

(22) Filed: May 18, 2011

(65) Prior Publication Data

US 2012/0043737 A1    Feb. 23, 2012

Related U.S. Application Data

(63) Continuation-in-part of application No. 29/368,365, filed on Aug. 23, 2010, now Pat. No. Des. 645,381.

(60) Provisional application No. 61/460,370, filed on Dec. 30, 2010.

(51) Int. Cl.
    *B62K 13/00* (2006.01)
    *B62K 5/00* (2013.01)

(52) U.S. Cl.
    USPC .......... 280/7.17; 280/7.15; 280/282; 280/301

(58) Field of Classification Search
    USPC ........ 280/7.17, 7.15, 7.1, 282, 301, 302, 303, 280/30; 16/30, 37–39
    See application file for complete search history.

(56) References Cited

U.S. PATENT DOCUMENTS

| | | | | |
|---|---|---|---|---|
| 2,197,658 A | * | 4/1940 | Gallo | 280/7.1 |
| 2,220,528 A | * | 11/1940 | Kutil | 280/7.15 |
| 2,301,036 A | * | 11/1942 | Gray | 280/282 |
| 2,591,534 A | * | 4/1952 | Gallo et al. | 280/7.15 |
| 3,062,559 A | * | 11/1962 | Hewitt | 280/202 |
| 3,096,100 A | * | 7/1963 | Clarke et al. | 280/261 |
| 3,427,037 A | * | 2/1969 | Marasco | 280/1.189 |
| 4,272,095 A | * | 6/1981 | Ptaszek | 280/220 |
| 4,327,929 A | * | 5/1982 | Melzian | 280/282 |
| 5,765,871 A | | 6/1998 | Wyman et al. | |
| D480,024 S | | 9/2003 | Gunter et al. | |
| D480,665 S | | 10/2003 | Gunter et al. | |
| D484,073 S | | 12/2003 | Heinemann et al. | |
| D582,489 S | | 12/2008 | Badanjo | |

* cited by examiner

*Primary Examiner* — Anne Marie M Boehler
(74) *Attorney, Agent, or Firm* — McDermott Will & Emery LLP (57) ABSTRACT

A riding toy provides a spin-out feature. The riding toy includes a frame, a steerable front wheel mounted to the frame and a rear wheel mounted to the frame. A rear carriage is pivotally attached to the frame so as to pivot about a generally horizontal axis. A caster is mounted to the rear carriage so as to pivot about a generally vertical axis. A lever is pivotally attached to the frame. A link has a leading end pivotally connected to the lever and a trailing end pivotally connected to the rear carriage. As a result, the riding toy may be changed from a traditional configuration, where the rear wheel of the riding toy contacts a riding surface upon which the riding toy is being ridden, to a spin-out configuration, where the caster lifts the rear wheel of the riding toy off of the riding surface, by pulling the lever.

19 Claims, 8 Drawing Sheets

SPIN-OUT RIDING TOY

CLAIM OF PRIORITY

This application is a continuation-in-part of U.S. patent application Ser. No. 29/368,365, filed Aug. 23, 2010, now U.S. Design Pat. No. D645381, and claims priority to provisional patent application No. 61/460,370, filed Dec. 30, 2010.

FIELD OF THE INVENTION

The present invention relates to riding toys for children and, more particularly, to a riding toy that provides a spin-out feature for children.

BACKGROUND

Riding toys, including, but not limited to, tricycles, have long been popular with children. In addition to providing a child with enjoyment and exercise, riding toys provide an opportunity for the child to develop his or her coordination and reflexes as the toy is ridden. Parents also appreciate such toys as they motivate a child to get out of the house and engage in physical activity or play.

Riding toys that provide more than one configuration or mode of operation are popular in that they essentially provide "two toys in one." This provides such a toy with increased versatility so that the toy is likely to experience more use and keep a child entertained for longer periods of time. Furthermore, such a toy is space efficient from the standpoint that only one toy needs to be stored or transported instead of two. A toy that provides more than one configuration or mode of play is therefore desirable.

It is also desirable for a riding toy to feature a unique operating configuration or mode that provides a child with action and excitement. Such a riding toy is likely to be very popular with a child and to hold the child's attention longer.

DETAILED DESCRIPTION OF EMBODIMENTS

Figure 1:
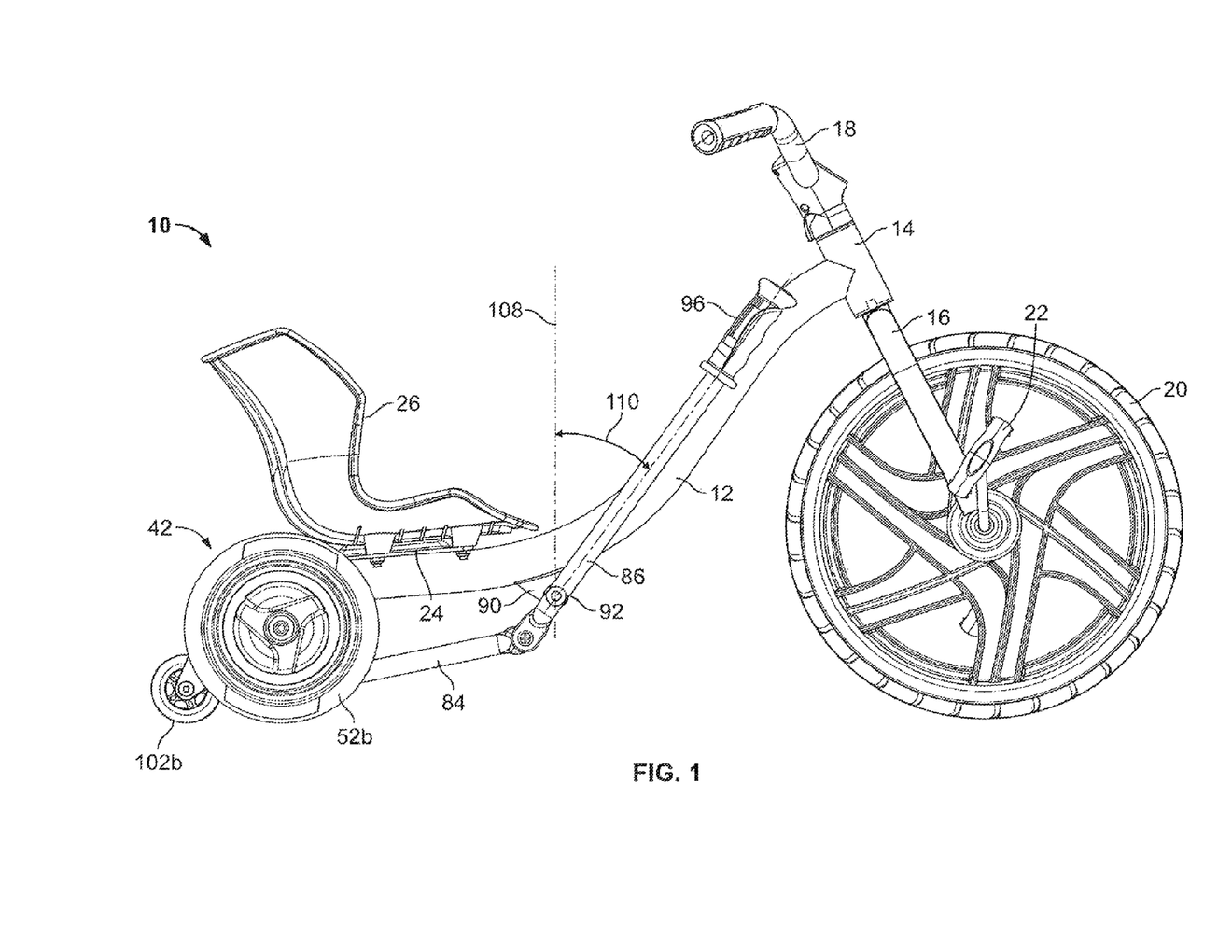
FIG. 1 is a side elevational view of an embodiment of the spin-out riding toy of the present invention.
Figure 2:
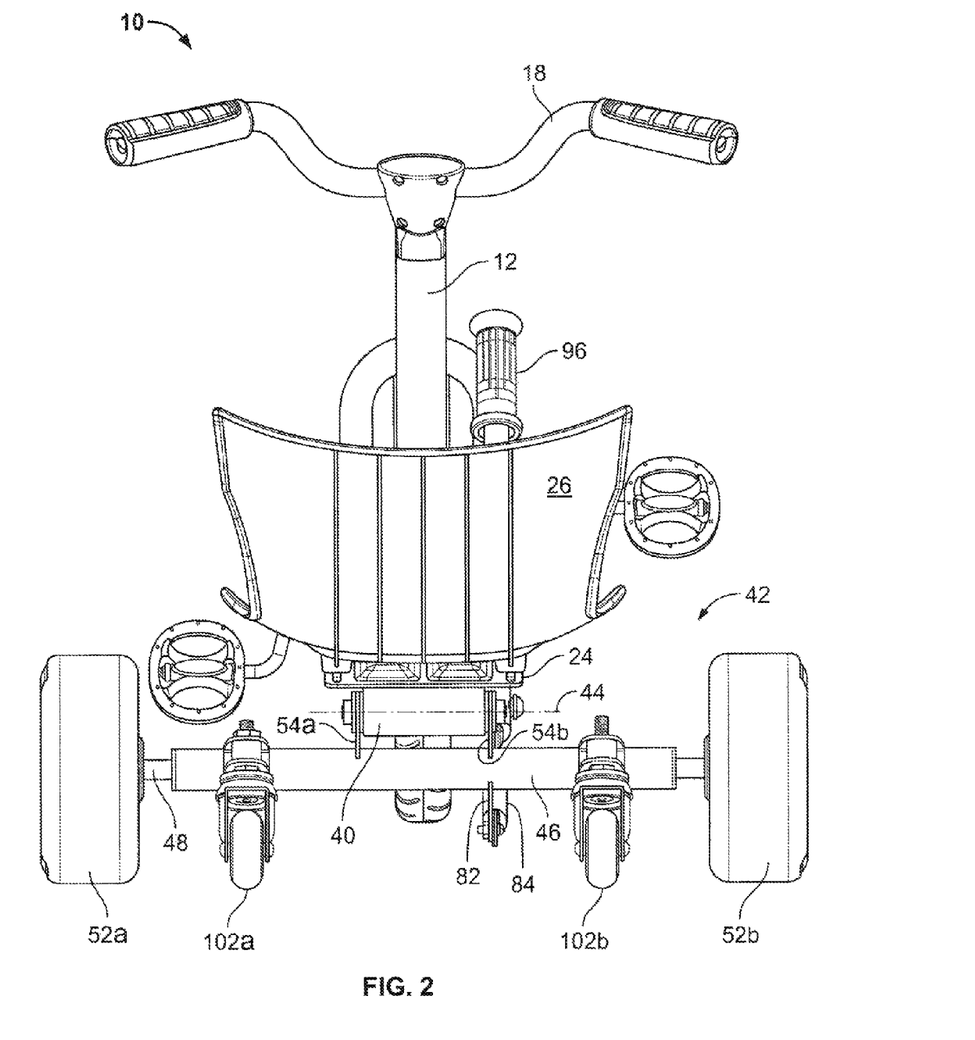
FIG. 2 is a rear elevational view of the riding toy of FIG. 1.
Figure 3:
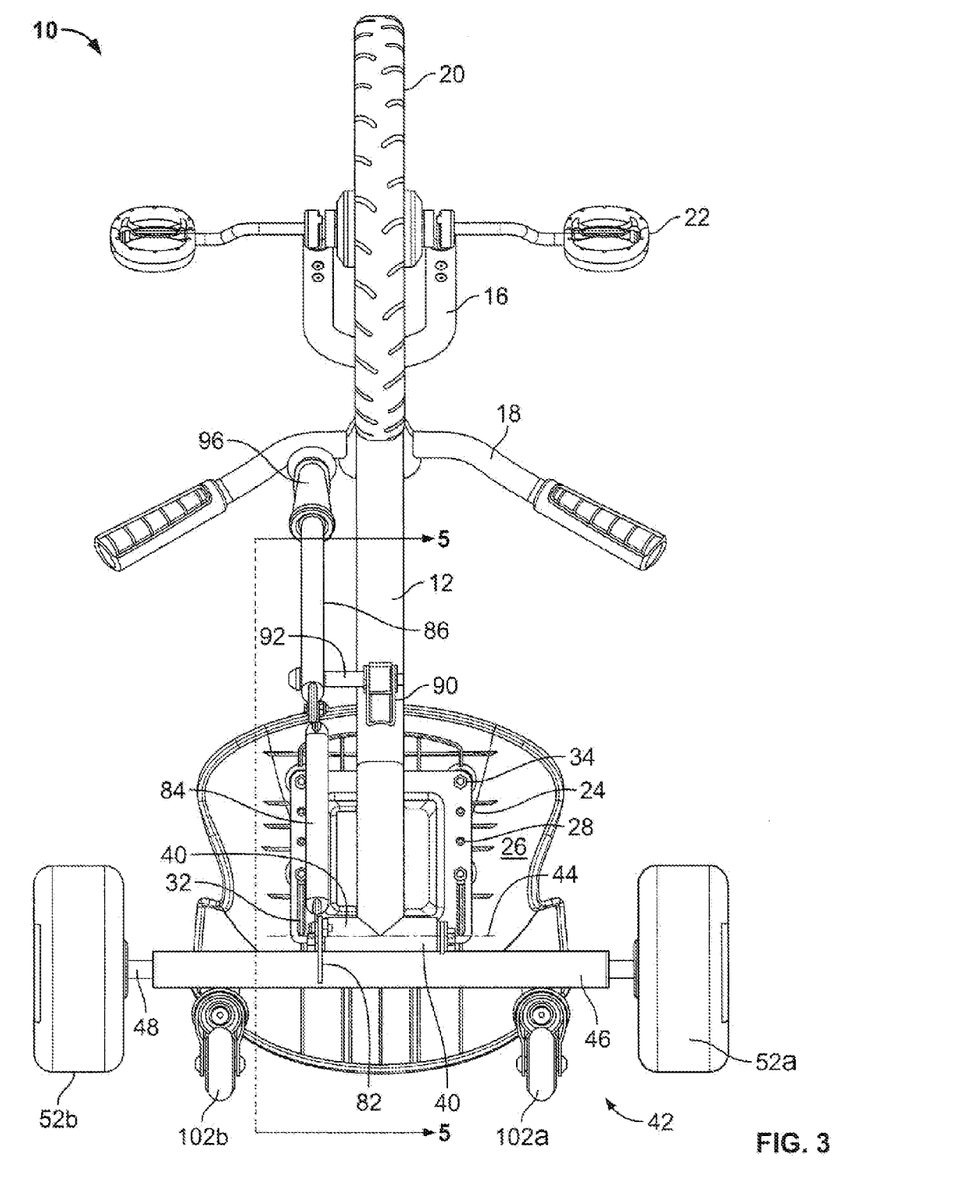
FIG. 3 is a bottom plan view of the riding toy of FIGS. 1 and 2.

An embodiment of the spin-out riding toy of the present invention is indicated in general at 10 in FIGS. 1-3. While the spin-out riding toy is illustrated as a "chopper style" tricycle, it is to be understood that the spin-out riding toy of the present invention could take the form of more traditional style tricycles or alternative types of riding toys, including those with more or less than three wheels.

As illustrated in FIGS. 1-3 the tricycle 10 features a frame in the form of a main frame tube 12. A head tube 14 is mounted to the leading end of the main frame tube. Main frame tube 12 and head tube 14 are preferably constructed from steel, but alternative rigid and durable materials may be used instead. Head tube 14 contains a bearing (not shown) which pivotally supports front fork 16 and handlebars 18 which are joined and received by the head tube so as to turn as a unit with respect to the main frame tube 12 (and the rest of the tricycle). A front wheel 20 is rotatably secured to the front fork and is equipped with pedals 22. A seat bracket 24 is mounted to the trailing portion of the main frame tube and supports a seat 26. As illustrated in FIG. 3, seat bracket 24, which preferably takes the form of a steel plate, preferably features a number of holes 28 and a pair of slots 32 which receive the seat mounting bolts 34. As a result, the fore and aft position of seat 26 may be adjusted based on the size of the child riding the toy. As is known in the art, a child sitting in seat 26 is able to rotate pedals 22 with his or her feet and grip handlebars 18 with his or her hands so as to propel and steer the tricycle.

As illustrated in FIGS. 2, 3 and 4A-4C, a hinge tube 40 is mounted to the trailing end of main frame tube 12. As will be explained in greater detail below, a rear carriage indicated in general at 42, is mounted to the main frame tube 12 via the hinge tube 40 so as to pivot about a generally horizontal axis, indicated in phantom at 44 in FIGS. 2, 3 and 4B. The rear carriage 42 of the tricycle features a rear axle housing, illustrated at 46, which receives the rear axle 48 (FIGS. 2 and 3) of the tricycle. Rear wheels 52a and 52b are mounted to opposing ends of the rear axle.

Figure 4A:
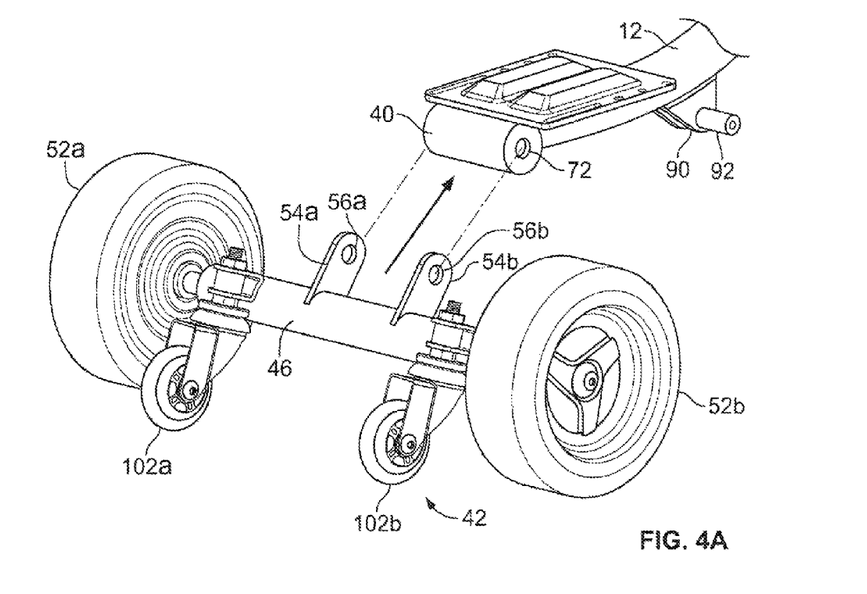
FIGS. 4A-4C are partial perspective views of the rear portion of the riding toy of FIGS. 1-3 illustrating assembly of the rear carriage to the hinge tube.
Figure 4B:
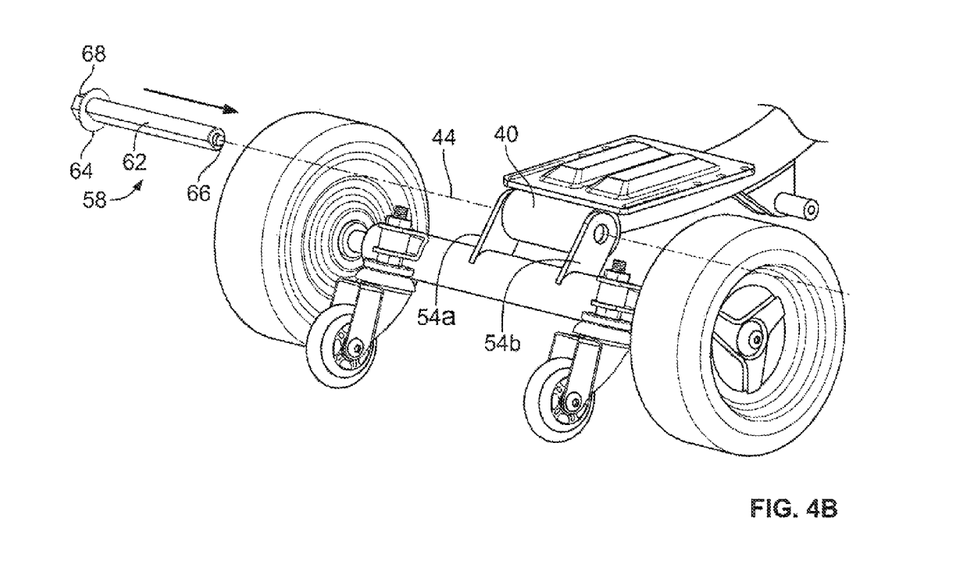
Figure 4C:
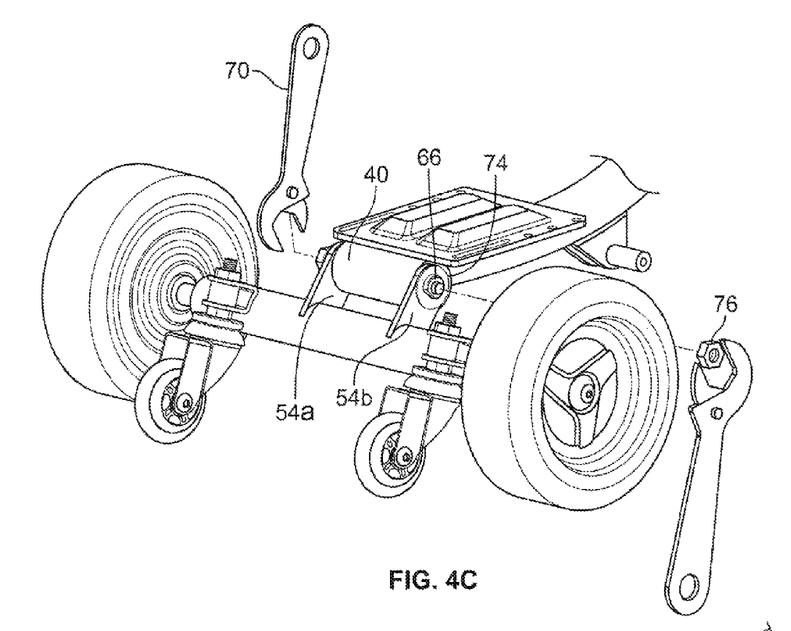

As illustrated in FIGS. 2 and 4A-4C, a pair of hinge tabs 54a and 54b are mounted to the top portion of the surface of the rear axle housing 46 in a spaced relationship. As illustrated in FIGS. 2, 4B and 4C, the hinge tube 40 is received between the hinge tabs 54a and 54b. As best seen in FIG. 4A, each hinge tab 54a and 54b features a D-shaped opening, indicated at 56a and 56b, respectively. A hinge pin, indicated in general at 58 in FIG. 4B, features a central portion 62 having a D-shaped cross section, a flange 64, a threaded stem 66 and a head 68 adapted for engagement by a tool (such as wrench 70 of FIG. 4C). As illustrated in FIG. 4B, the D-shaped central portion of hinge pin 58 is inserted through the corresponding D-shaped opening 56a of hinge tab 54a, through a bore 72 (FIG. 4A) formed through the hinge tube 40, and then through the D-shaped-opening 56b of hinge tab 54b. As illustrated in FIG. 4C, a washer 74 is positioned over the exposed stem 66 of the hinge pin and then a nut 76 is attached via the threads of the stem and tightened via tools, such as wrenches 70. As a result, the rear carriage 42, hinge tabs 54a and 54b and hinge pin 58 pivot as a single unit, with hinge pin 58 pivoting within the bore 72 of the hinge tube 40.

As illustrated in FIGS. 1-3 and 5A-5C, a swing arm 82 is mounted to the bottom portion of the surface of the axle housing 46. The distal end of the swing arm 82 has pivotally secured thereto the trailing end of link 84. The leading end of link 84 is pivotally secured to the bottom end of a lever 86. The lever is also pivotally secured to the main frame tube 12 of the tricycle by lever mounting bracket 90 and lever pin 92. A hand grip 96 is positioned on the top end portion of the lever 86.

Figure 5A:
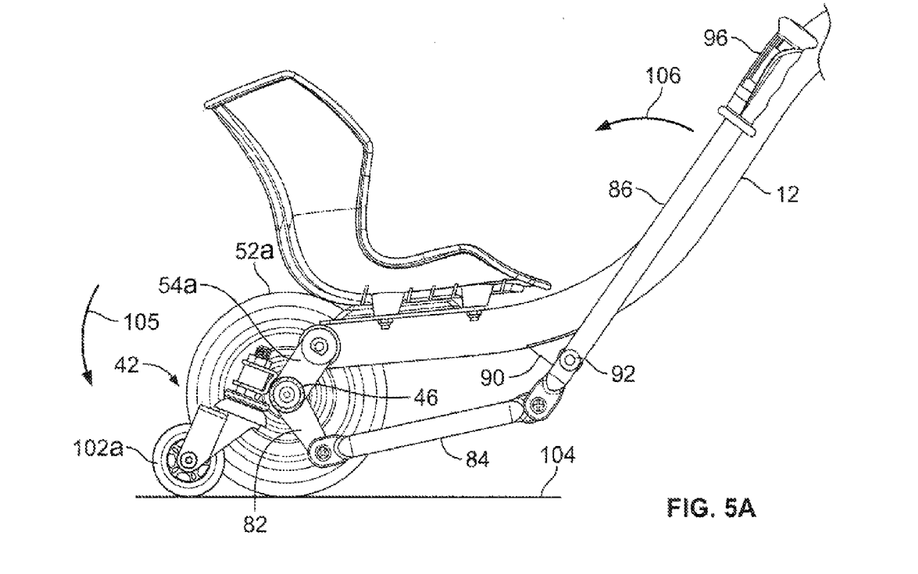
FIGS. 5A-5C are partial side elevational, broken away views of the rear portion of the riding toy of FIGS. 1-4C taken along line 5-5 of FIG. 3 illustrating operation of the spin-out feature of the riding toy.

As will be explained greater detail below, a pair of casters, indicated at 102a and 102b in FIGS. 2-4C, are also mounted in a spaced fashion to the rear portion of the surface of rear axle housing 46. With reference to FIGS. 5A and 1, the hinge tabs 54a and 54b, swing arm 82 and casters 102a and 102b are all preferably mounted on the rear axle housing 46 in positions such that the casters 102a and 102b contact and travel along a riding surface 104 as the rear wheels 52a and 52b and front wheel of the tricycle traverse the riding surface. This prevents the casters 102a and 102b from undesirable free movement as the tricycle is ridden and, as will become apparent, minimizes delay of activation of the spin-out feature when the child pulls the lever 86.

In an alternative embodiment, the casters 102a and 102b may be attached to the tricycle in such a way as to be raised so that they do not contact a surface upon which the tricycle is ridden until the child pulls the lever 86.

In operation, a child riding the tricycle may pull the lever 86 from its rest position to provide a spin-out configuration or mode. More specifically, as the child pulls the lever 86 in the direction of arrow 106 of FIG. 5A, the rear carriage 42 of the tricycle pivots about axis 44 (FIGS. 2, 3 and 4B) in a counter clockwise direction as illustrated by arrow 105 in FIG. 5A and in FIGS. 5B and 5C. As a result, the casters and the rear carriage of the tricycle are lowered, as illustrated for caster 102a, and the rear wheels of the tricycle are raised, as illustrated for rear wheel 52a, so that the rear wheels of the tricycle no longer contact surface 104. The rear of the tricycle thus is supported on the surface 104 only by casters 102a and 102b (FIGS. 1-4C), each of which are free to pivot 360° about a corresponding generally vertical axis, such as the axis illustrated in phantom at 106 in FIG. 5C for caster 102a. When the tricycle is in this spin-out configuration, with lever 86 in the spin-out position illustrated in FIG. 5C, the rear of the tricycle is free to move sideways, or in virtually any other direction, via the lowered casters when the child turns the tricycle front wheel via the handlebars 18 (FIGS. 1-3). When operated in this fashion, the child can induce the tricycle to spin-out, which provides an enjoyable and exciting riding experience.

When the child releases the lever 86, the rear carriage 42 pivots about axis 44 in a clockwise direction so that the rear carriage and casters are raised to the level position (where the casters still contact the surface). As a result, the rear wheels of the tricycle again contact the surface 104, as illustrated in FIG. 5A, so that the tricycle operates in a traditional fashion. The low position of the seat 26 (FIGS. 1-3) provides the toy with a low center of gravity which provides great stability both when in the traditional tricycle configuration and the spin-out configuration.

Figure 5B:
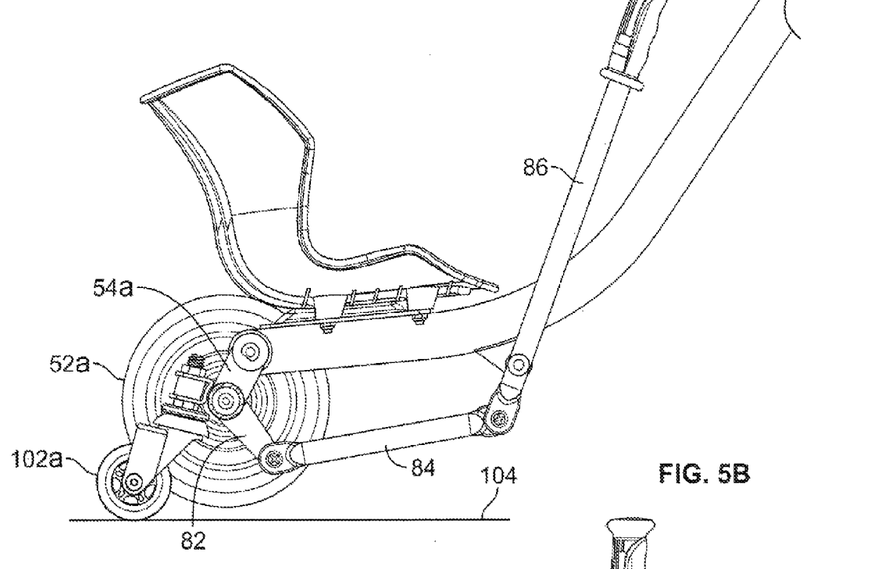
Figure 5C:
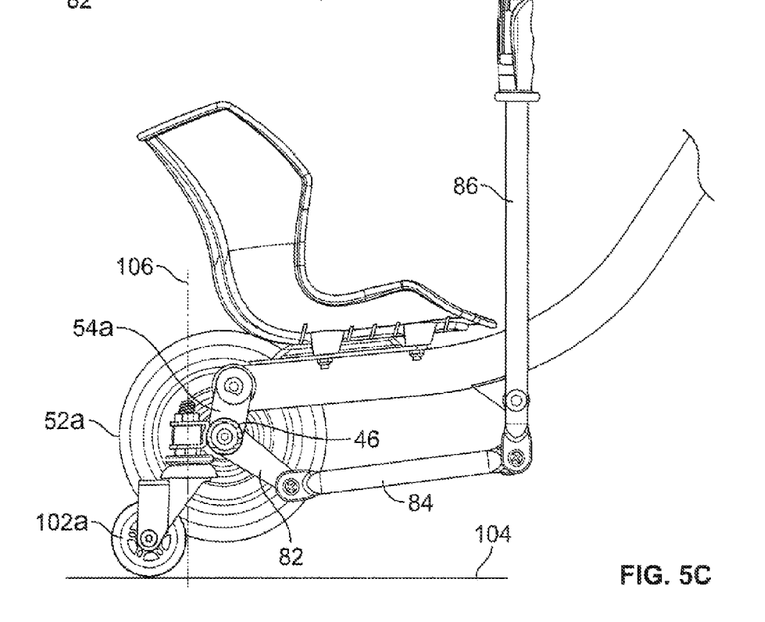

The lever 86 of the tricycle may therefore be moved between a rest position, illustrated in FIGS. 1 and 5A, corresponding to the rear carriage and casters in a level position (FIGS. 1 and 5A), so that the casters contact the riding surface 104 (FIG. 5A) but do not raise the rear wheels of the tricycle from the surface, and a spin-out position, illustrated in FIG. 5C and in phantom at 108 in FIG. 1, corresponding to the rear carriage and casters in a lowered position (FIG. 5C), so that the casters lift the rear wheels of the tricycle off of the riding surface.

With reference to FIGS. 5A-5C, the three-bar linkage mechanism formed by lever 86, link 84 and swing arm 82 converts the long and easy travel distance of the lever 86 into a short but powerful travel distance by the casters from their level position (FIG. 5A) to their lowered position (FIG. 5C). As an example only, the angle between the lever in the rest and spin-out positions, indicated by arrows 110 in FIG. 1, is preferably approximately 33°.

In an alternative embodiment of the riding toy, the rear wheels of the tricycle are rotatably mounted to main frame tube 12 so as to rotate about an axis that is fixed with respect to the tricycle main frame tube so that they do not pivot with the rear carriage 42. In such an embodiment, only the casters are mounted to the rear carriage so as to be lowered when the lever is pulled into the spin-out position.

Figure 6:
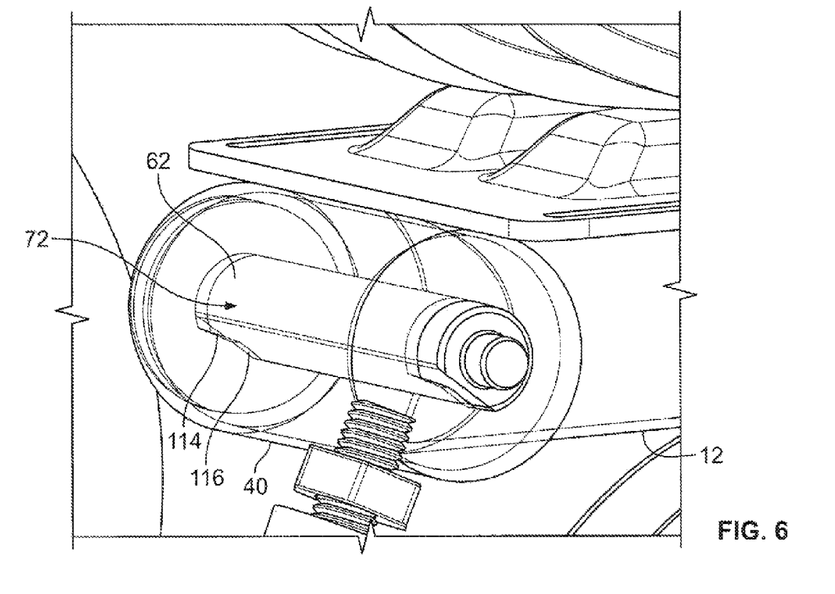
FIG. 6 is an enlarged transparent perspective view of the hinge tube of the riding toy of FIGS. 1-5C with the hinge pin inserted.
Figure 7:
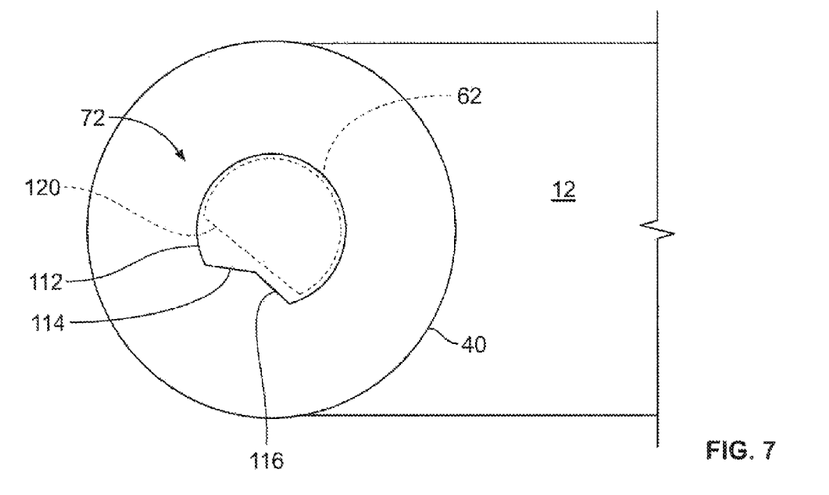
FIG. 7 is an enlarged side elevational view of the hinge tube and hinge pin of FIG. 6.

As described previously with reference to FIGS. 4A-4C, the rear carriage 42 of the tricycle is preferably mounted to the hinge tube 40 via a hinge pin that features a D-shaped central portion (62 in FIG. 4B). Enlarged views of the hinge tube 40, including bore 72 with the D-shaped central portion 62 of the hinge pin (58 of FIG. 4B) positioned therein, are provided in FIGS. 6 and 7. As illustrated in FIGS. 6 and 7, the bore 72 of the hinge tube 40 features a curved interior wall 112 that terminates at carriage lowered position stop 114 and carriage level position stop 116. The central portion 62 of the hinge pin is free to pivot within the bore until its flat surface, indicated at 120 in FIG. 7, comes into contact with either stop 114 or 116. When the hinge pin central portion flat surface 120 is in contact with carriage lowered position stop 114, the casters and rear carriage are in the lowered position, and the tricycle is in the spin-out configuration, illustrated in FIG. 5C. When the hinge pin central portion flat surface 120 is in contact with the carriage level position stop 116, the casters and rear carriage are in the level position, and the tricycle is in the traditional tricycle configuration, illustrated in FIG. 5A. As a result, the stops 114 and 116 within the bore 72 of hinge tube 40 provide pinch-free or no-pinch stoppers for the pivoting action of the tricycle rear carriage. In FIG. 7, the hinge pin is illustrated in a transition position, corresponding to FIG. 5B.

Figure 8:
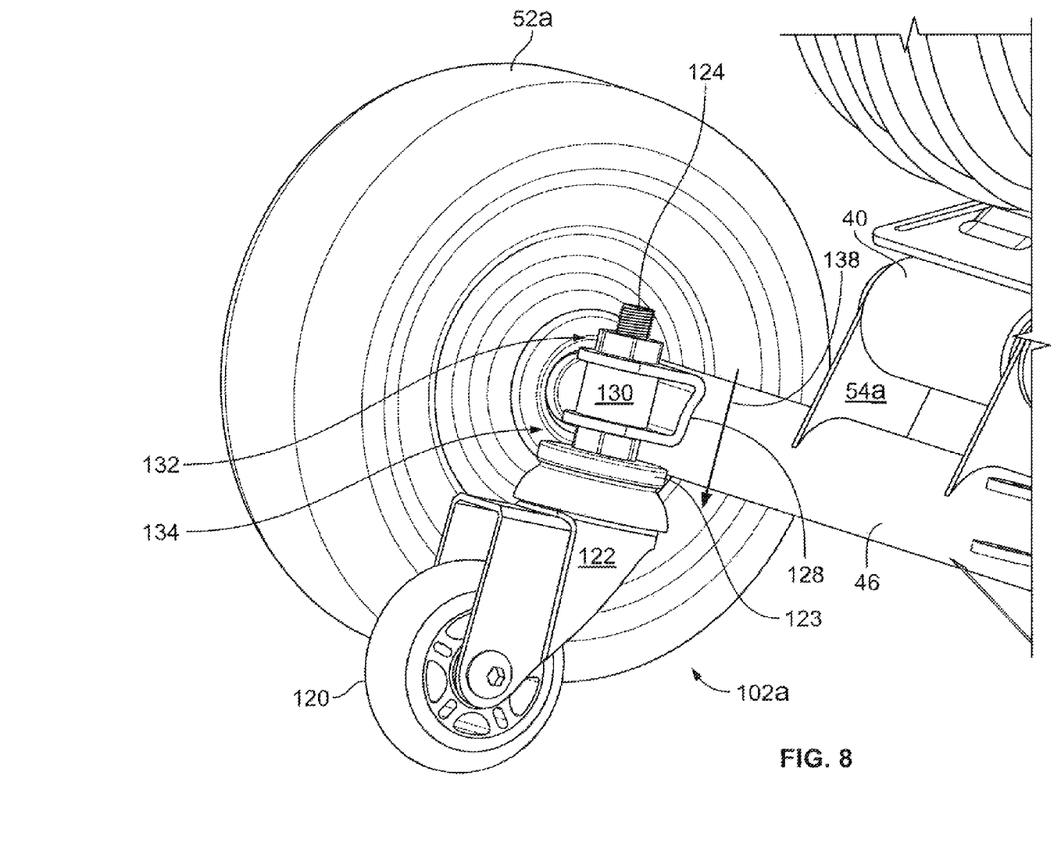
FIG. 8 is an enlarged perspective view of one of the casters of the riding toy of FIGS. 1-7.

An enlarged view of caster 102a is provided in FIG. 8. The caster features a caster wheel 120 rotatably fastened to a bifurcated caster body 122. The top of the caster body is rotatably mounted to a circular top plate 123 so as to move through an angle of 360°. A threaded caster stem 124 is secured to the top plate 123. The caster body and wheel rotates about a generally vertical axis (illustrated in phantom at 106 in FIG. 5C) with respect to the top plate 123 and stem 124. A caster mounting bracket 128, featuring a spaced pair of legs, is secured to the rear axle housing 46 of the tricycle. Each of the legs of the bracket 128 features an opening through which the caster stem 124 passes. A spacer 130 is positioned between the legs of the bracket 128 and receives the stem 124. An upper caster nut 132 and a lower caster nut 134 are both also positioned on the threaded caster stem 124.

As the tricycle is ridden, the caster wheel may become worn so that it no longer contacts the surface upon which the tricycle is ridden when the casters are in the level position. The construction of caster 102a described above allows for adjustment of the caster tracking so that it remains in contact with the riding surface. More specifically, to lower the caster wheel 120 with respect to the tricycle rear axle housing 46, and the remainder of the tricycle rear carriage, the upper caster nut 132 is first loosened slightly. Lower caster nut may then be rotated so that the caster body 122 and wheel 120 are lowered, as indicated by arrow 138 of FIG. 8. When the desired position of caster wheel 120 is reached, that is, when contact with the riding surface is made, upper caster nut is tightened to lock the caster body and wheel into the selected position.

Caster 102b (FIGS. 1-4C) features a construction and operation that are the same as caster 102a of FIG. 8.

While the preferred embodiments of the invention have been shown and described, it will be apparent to those skilled in the art that changes and modifications may be made therein without departing from the spirit of the invention, the scope of which is defined by the appended claims.

What is claimed is:

1. A riding toy comprising:
a) a frame;

b) a steerable front wheel mounted to the frame;
c) a rear wheel mounted to the frame;
d) a rear carriage pivotally attached to the frame so as to pivot about a generally horizontal axis;
e) a caster mounted to the rear carriage so as to pivot about a generally vertical axis;
f) a lever pivotally attached to the frame; and
g) a link having a leading end pivotally connected to a bottom end portion of the lever below a location where the lever is pivotally attached to the frame, and a trailing end pivotally connected to the rear carriage so that when the lever is pulled, the rear carriage pivots from a level position, where the rear wheel of the riding toy contacts a riding surface upon which the riding toy is being ridden, to a lowered position where the caster lifts the rear wheel of the riding toy off of the riding surface.

2. The riding toy of claim 1 further comprising:
h) a hinge tube attached to the frame, said hinge tube having a bore;
i) a spaced pair of hinge tabs attached to the rear carriage;
j) said hinge tube positioned between the pair of hinge tabs; and
k) a hinge pin passing through the bore of the hinge tube and engaging the spaced pair of hinge tabs.

3. The riding toy of claim 2 wherein the hinge pin includes a generally D-shaped portion and the bore of the hinge tube includes a curved interior wall that terminates in a carriage lowered position stop at one end and a carriage level position stop on an opposite end.

4. The riding toy of claim 1 wherein the trailing end of the link is attached to the rear carriage by a swing arm.

5. The riding toy of claim 1 wherein the caster contacts the riding surface when the rear carriage is in the level position.

6. The riding toy of claim 1 further comprising a second rear wheel mounted to the frame, where the second rear wheel of the riding toy also contacts the riding surface upon which the riding toy is being ridden when the rear carriage is in the level position and where the caster also lifts the second rear wheel of the riding toy off of the riding surface when the carriage is in the lowered position.

7. A riding toy comprising:
a) a frame;
b) a steerable front wheel mounted to the frame;
c) a rear wheel mounted to a rear carriage so as to be mounted to the frame via the rear carriage;
d) the rear carriage pivotally attached to the frame so as to pivot about a generally horizontal axis;
e) a caster mounted to the rear carriage so as to pivot about a generally vertical axis;
f) a lever pivotally attached to the frame; and
g) a link having a leading end pivotally connected to the lever and a trailing end pivotally connected to the rear carriage so that when the lever is pulled, the rear carriage pivots from a level position, where the rear wheel of the riding toy contacts a riding surface upon which the riding toy is being ridden, to a lowered position where the caster lifts the rear wheel of the riding toy off of the riding surface.

8. The riding toy of claim 7 wherein the riding toy is a tricycle and the rear carriage includes an axle housing and further comprising:
h) an axle having a first end and a second end, said axle passing through the axle housing and having the rear wheel positioned on the first end;
i) a second rear wheel positioned on the second end of the axle;
j) a seat mounted on the frame;
k) a front fork attached to the front wheel, said front fork pivotally attached to the frame; and
l) handlebars attached to the front fork.

9. The riding toy of claim 8 wherein the frame is a main frame tube.

10. A riding toy comprising:
a) a frame;
b) a steerable front wheel mounted to the frame;
c) a rear wheel mounted to the frame;
d) a rear carriage pivotally attached to the frame so as to pivot about a generally horizontal axis;
e) a caster mounted to the rear carriage so as to pivot about a generally vertical axis, wherein the caster includes:
  i. a caster body;
  ii. a caster wheel rotatably attached to the caster body;
  iii. a threaded caster stem pivotally attached to a top portion of the caster body;
f) a lever pivotally attached to the frame;
g) a link having a leading end pivotally connected to the lever and a trailing end pivotally connected to the rear carriage so that when the lever is pulled, the rear carriage pivots from a level position, where the rear wheel of the riding toy contacts a riding surface upon which the riding toy is being ridden, to a lowered position where the caster lifts the rear wheel of the riding toy off of the riding surface;
h) a caster mounting bracket attached to the rear carriage, said caster mounting bracket having an opening with the threaded caster stem positioned there through;
i) an upper caster nut engaging the threaded caster stem and positioned on a first side of the caster mounting bracket and a lower caster nut engaging the threaded caster stem and positioned on a second side of the caster mounting bracket.

11. The riding toy of claim 10 wherein the caster mounting bracket includes a pair of spaced legs, each of which having an opening through which the threaded caster stem passes; and further comprising a spacer positioned between the pair of spaced legs and positioned so that threaded caster stem passes there through.

12. A riding toy comprising:
a) a frame;
b) a steerable front wheel mounted to the frame;
c) a rear wheel mounted to the frame;
d) a rear carriage pivotally attached to the frame so as to pivot about a generally horizontal axis;
e) a caster mounted to the rear carriage so as to pivot about a generally vertical axis;
f) a lever pivotally attached to the frame; and
g) a link having a leading end pivotally connected to a bottom end portion of the lever below a location where the lever is pivotally attached to the frame and a trailing end pivotally connected to the rear carriage;
whereby said riding toy may be changed from a traditional configuration, where the rear wheel of the riding toy contacts a riding surface upon which the riding toy is being ridden, to a spin-out configuration, where the caster lifts the rear wheel of the riding toy off of the riding surface, by pulling the lever.

13. The riding toy of claim 12 wherein the trailing end of the link is attached to the rear carriage by a swing arm.

14. The riding toy of claim 12 further comprising a second rear wheel mounted to the frame, where the second rear wheel of the riding toy also contacts the riding surface upon which the riding toy is being ridden when the riding toy is in a traditional configuration and where the caster also lifts the second rear wheel of the riding toy off of the riding surface when the riding toy is in the spin-out configuration.

15. A riding toy comprising:
a) a frame;
b) a steerable front wheel mounted to the frame;
c) a rear wheel mounted to a rear carriage so as to be mounted to the frame via the rear carriage;
d) the rear carriage pivotally attached to the frame so as to pivot about a generally horizontal axis;
e) a caster mounted to the rear carriage so as to pivot about a generally vertical axis;
f) a lever pivotally attached to the frame; and
g) a link having a leading end pivotally connected to a bottom end portion of the lever below a location where the lever is pivotally attached to the frame and a trailing end pivotally connected to the rear carriage;
whereby said riding toy may be changed from a traditional configuration, where the rear wheel of the riding toy contacts a riding surface upon which the riding toy is being ridden, to a spin-out configuration, where the caster lifts the rear wheel of the riding toy off of the riding surface, by pulling the lever.

16. The riding toy of claim 15 wherein the riding toy is a tricycle and the rear carriage includes an axle housing and further comprising:
h) an axle having a first end and a second end, said axle passing through the axle housing and having the rear wheel positioned on the first end;
i) a second rear wheel positioned on the second end of the axle;
j) a seat mounted on the frame;
k) a front fork attached to the front wheel, said front fork pivotally attached to the frame; and
l) handlebars attached to the front fork.

17. The riding toy of claim 16 wherein the frame is a main frame tube.

18. A riding toy comprising:
a) a frame;
b) a steerable front wheel mounted to the frame;
c) a rear wheel mounted to the frame;
d) a rear carriage pivotally attached to the frame so as to pivot about a generally horizontal axis;
e) a caster mounted to the rear carriage so as to pivot about a generally vertical axis;
f) a lever pivotally attached to the frame; and
g) a link having a leading end pivotally connected to the lever and a trailing end pivotally connected to the rear carriage;
h) a hinge tube attached to the frame, said hinge tube having a bore;
i) a spaced pair of hinge tabs attached to the rear carriage;
j) said hinge tube positioned between the pair of hinge tabs; and
k) a hinge pin passing through the bore of the hinge tube and engaging the spaced pair of hinge tabs;
whereby said riding toy may be changed from a traditional configuration, where the rear wheel of the riding toy contacts a riding surface upon which the riding toy is being ridden, to a spin-out configuration, where the caster lifts the rear wheel of the riding toy off of the riding surface, by pulling the lever.

19. The riding toy of claim 18 wherein the hinge pin includes a generally D-shaped portion and the bore of the hinge tube includes a curved interior wall that terminates in a carriage lowered position stop at one end and a carriage level position stop on an opposite end.

* * * * *